United States Patent
Schaude

(10) Patent No.: US 11,269,603 B2
(45) Date of Patent: *Mar. 8, 2022

(54) COMPILER FOR CONTEXT-DEPENDENT CODE GLOBAL DATA TYPES

(71) Applicant: SAP SE, Walldorf (DE)

(72) Inventor: Horst F. Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,722

(22) Filed: Jun. 9, 2020

(65) Prior Publication Data

US 2020/0301683 A1 Sep. 24, 2020

Related U.S. Application Data

(63) Continuation of application No. 16/200,296, filed on Nov. 26, 2018, now Pat. No. 10,725,753.

(51) Int. Cl.
*G06F 8/41* (2018.01)
*G06F 8/36* (2018.01)
(Continued)

(52) U.S. Cl.
CPC .............. *G06F 8/437* (2013.01); *G06F 8/36* (2013.01); *G06F 16/951* (2019.01); *G06F 16/284* (2019.01)

(58) Field of Classification Search
CPC .......... G06F 8/437; G06F 16/951; G06F 8/36; G06F 16/284; G06F 16/958
See application file for complete search history.

(56) References Cited

U.S. PATENT DOCUMENTS

| | | | |
|---|---|---|---|
| 8,516,443 B2 * | 8/2013 | Li | G06F 8/75 717/123 |
| 8,966,635 B2 * | 2/2015 | Dewey | G06F 21/54 726/25 |

(Continued)

OTHER PUBLICATIONS

"U.S. Appl. No. 16/200,296, Non Final Office Action dated Nov. 1, 2019", 14 pgs.

(Continued)

*Primary Examiner* — Daxin Wu
(74) *Attorney, Agent, or Firm* — Schwegman Lundberg & Woessner, P.A.

(57) ABSTRACT

A compiler for a software development kit is disclosed. In some embodiments, a computer-implemented method comprises receiving source code comprising an object node having a data type definition for a code value, detecting that the data type definition of the object node includes a context-dependent data type, where the context-dependent data type is dependent on at least one other data type, determining a corresponding value for each one of the other data type(s) based on the detecting that the data type definition includes the context-dependent data type, and generating a runtime instance of a software solution based on the source code, where the generating the runtime instance comprises assigning the corresponding value for each other data type as a single list ID for the object node, and the single list ID for the object node is configured to be used to determine a dedicated value of the code value.

20 Claims, 9 Drawing Sheets

(51) Int. Cl.
    *G06F 16/951*     (2019.01)
    *G06F 16/28*     (2019.01)

(56) References Cited

U.S. PATENT DOCUMENTS

| | | | |
|---|---|---|---|
| 9,658,943 B2 * | 5/2017 | Gounares | G06F 11/3664 |
| 9,734,040 B2 * | 8/2017 | Gounares | G06F 11/3636 |
| 2011/0191756 A1 * | 8/2011 | Shinjo | G06F 16/185 |
| | | | 717/141 |
| 2012/0137268 A1 * | 5/2012 | Dattke | G06F 8/33 |
| | | | 717/105 |
| 2014/0137087 A1 * | 5/2014 | Cimadamore | G06F 9/4484 |
| | | | 717/140 |
| 2016/0180200 A1 * | 6/2016 | Vijayanarasimhan | |
| | | | G06N 3/082 |
| | | | 382/157 |
| 2020/0167138 A1 | 5/2020 | Schaude | |

OTHER PUBLICATIONS

"U.S. Appl. No. 16/200,296, Notice of Allowance dated Mar. 24, 2020", 8 pgs.

"U.S. Appl. No. 16/200,296, Response filed Jan. 29, 2020 to Non Final Office Action dated Nov. 1, 2019", 13 pgs.

\* cited by examiner

| LIST ID | CODE VALUE | DESCRIPTION |
|---|---|---|
| LIST ID 1 | CODE VALUE 1 | DESCRIPTION 1 |
| LIST ID 2 | CODE VALUE 1 | DESCRIPTION 2 |
| . . . | . . . | . . . |
| LIST ID N | CODE VALUE 1 | DESCRIPTION N |
| LIST ID N+1 | CODE VALUE 2 | DESCRIPTION N+1 |
| LIST ID N+2 | CODE VALUE 2 | DESCRIPTION N+2 |
| . . . | . . . | . . . |
| LIST ID N+M | CODE VALUE 2 | DESCRIPTION N+M |
| LIST ID N+M+1 | CODE VALUE 3 | DESCRIPTION N+M+1 |
| LIST ID N+M+2 | CODE VALUE 3 | DESCRIPTION N+M+2 |
| . . . | . . . | . . . |

| LIST ID | REGION CODE | DESCRIPTION |
|---|---|---|
| AD | 08 | ESCALDES-ENGORDANY |
| AR | 08 | LA ROJA |
| BD | 08 | KUMILLA (CHITTAGONG) |
| BE | 08 | EAST FLANDERS |
| BG | 08 | SOFIYA |
| CL | 08 | VIII - CONCEPCION |
| CO | 08 | ATLANTICO |
| DE | 08 | BADEN-WURTTEMBERG |
| ES | 08 | BARCELONA |
| FI | 08 | CENTRAL FINLAND |
| FR | 08 | ARDENNES |
| ... | ... | ... |

*FIG. 5*

COMPILER FOR CONTEXT-DEPENDENT CODE GLOBAL DATA TYPES

CROSS-REFERENCE TO RELATED APPLICATIONS

This application is a continuation of prior application Ser. No. 16/200,296, filed on Nov. 26, 2018, which is incorporated by reference herein in its entirety.

TECHNICAL FIELD

The present application relates generally to the technical field of software development within an electrical computer system architecture, and, in various embodiments, to systems and methods of a compiler for a software development kit within a cloud computing system architecture.

BACKGROUND

In cloud computing system architectures, software development tools may be used to develop software solutions, which may then be deployed for use by end users. Software development tools may provide certain codes that software developers may use in developing software solutions. While the values of certain codes may be independent, other code values may be dependent on a context to make clear what they represent. Currently, there lacks an accurate, efficient, and convenient way of maintaining the context of a context-dependent code from the development stage to the runtime stage, thereby diminishing the accuracy, efficiency, and convenience of cloud computing system architectures that use context-dependent codes. The present disclosure addresses these and other technical problems that plague the computer functionality of cloud computing system architectures.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4 illustrates a table of list identifications (IDs), code values, and code value descriptions, in accordance with some example embodiments.

FIG. 5 illustrates another table of list ID's, code values, and code value descriptions, in accordance with some example embodiments.

DETAILED DESCRIPTION

Figure 1:
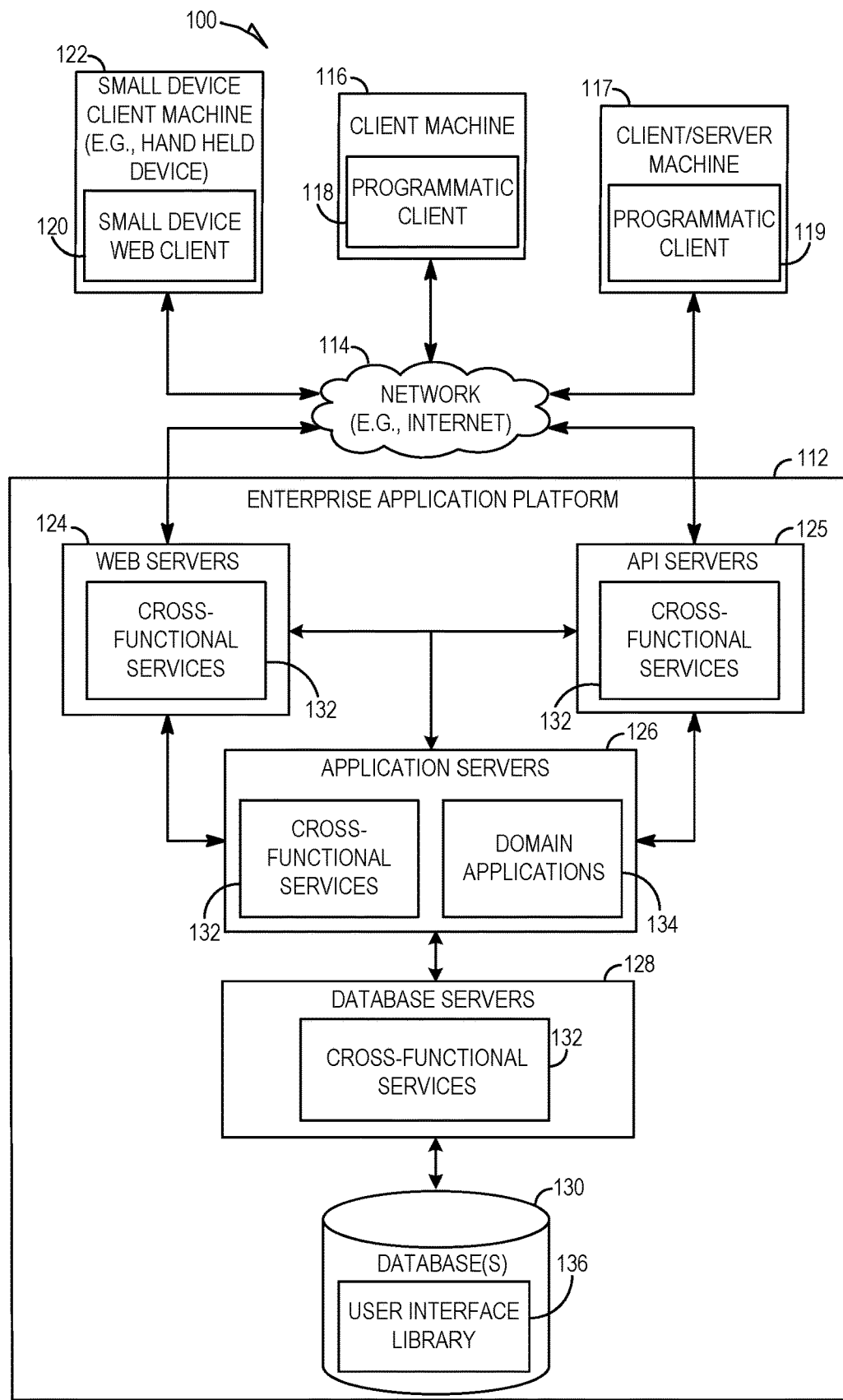
FIG. 1 is a network diagram illustrating a client-server system, in accordance with some example embodiments.

Example methods and systems for improving the accuracy, efficiency, and convenience of a cloud computing system architecture by implementing a compiler for a software development kit within the cloud computing system architecture are disclosed. In the following description, for purposes of explanation, numerous specific details are set forth in order to provide a thorough understanding of example embodiments. It will be evident, however, to one skilled in the art that the present embodiments can be practiced without these specific details.

One technical effect of the system and method of the present disclosure is to improve the accuracy, efficiency, and convenience of a cloud computing system architecture by implementing a compiler of a software development kit that maintains the context of a context-dependent code from the development stage to the runtime stage of a software solution within the cloud computing system architecture. Additionally, other technical effects that improve the functionality of computer systems will be apparent from this disclosure as well.

In some example embodiments, a computer-implemented method comprises: receiving source code generated within a software development kit, the received source code comprising an object node having a data type definition for a code value; detecting that the data type definition of the object node includes a context-dependent data type, the context-dependent data type being dependent on at least one other data type; determining a corresponding value for each one of the at least one other data type in response to, or otherwise based on, the detecting that the data type definition of the object node includes the context-dependent data type; generating a runtime instance of a software solution based on the source code, the generating of the runtime instance of the software solution comprising assigning the corresponding value for each one of the at least one other data type as a single list identification (ID) for the object node, the single list ID for the object node being configured to be used to determine a dedicated value of the code value; and executing the runtime instance of the software solution, the executing the runtime instance comprising retrieving the dedicated value of the code value using the single list ID and performing a function of the runtime instance of the software solution using the retrieved dedicated value of the code value.

In some example embodiments, the at least one other data type comprises a plurality of other data types, and the single list ID for the object node comprises a combination of the plurality of other data types.

In some example embodiments, the determining the corresponding value for each one of the at least one other data type comprises: retrieving context structure information for the context-dependent data type from a database; identifying the at least one other data type based on the retrieved context structure information; searching the object node for any elements having a corresponding data type that matches any of the at least one other data type; identifying at least one element of the object node having a corresponding data type that matches any of the at least one other data type based on the searching of the object node; and determining a corresponding value for each one of the identified at least one element of the object node, the corresponding value for each one of the identified at least one element of the object node being the corresponding value for each one of the at least one other data type.

In some example embodiments, the generating of the runtime instance of the software solution is performed by a compiler of the software development kit.

In some example embodiment, the retrieving the dedicated value of the code value using the single list ID comprises: searching a code list for an entry having a corresponding list ID that matches the single list ID; identifying the entry having the corresponding list ID that matched the single list ID based on the search of the code list; and retrieving a corresponding value of the identified entry for use as the dedicated value of the code value.

In some example embodiments, the performing of the function of the runtime instance of the software solution comprises displaying the retrieved dedicated value of the code value on a computing device. In some example embodiments, the performing of the function of the runtime instance of the software solution comprises performing a calculation using the retrieved dedicated value of the code value.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
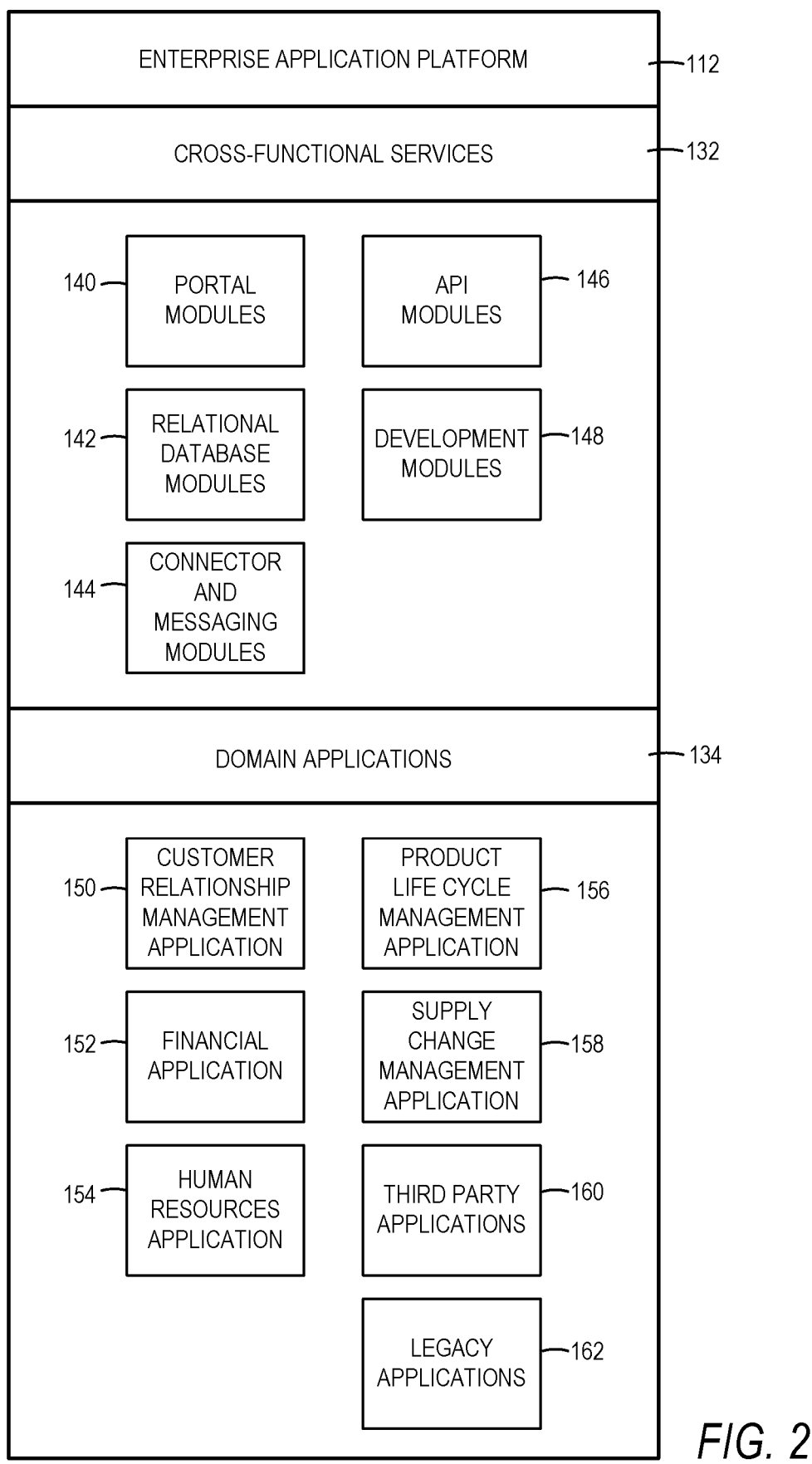
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
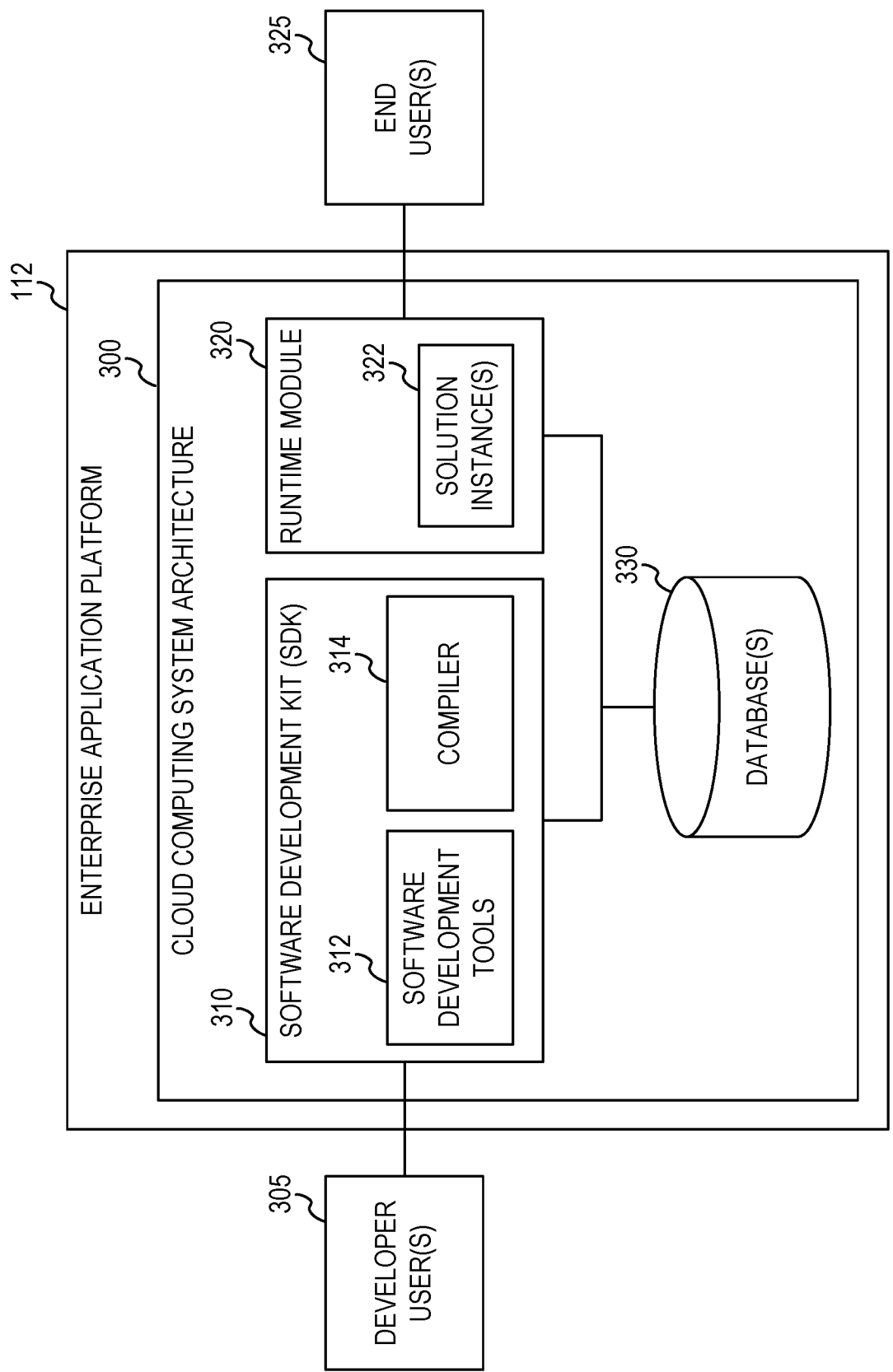
FIG. 3 is a block diagram illustrating a cloud computing system architecture in which a compiler for context-dependent code global data types is implemented, in accordance with some example embodiments.

FIG. 3 is a block diagram illustrating a cloud computing system architecture 300 in which a compiler 314 for context-dependent code global data types is implemented, in accordance with some example embodiments. In some example embodiments, the cloud computing system architecture 300 is implemented by the enterprise application platform 112. However, the cloud computing system architecture 300 may be implemented in other ways as well.

In some example embodiments, the cloud computing system architecture 300 comprises any combination of one or more of a software development kit (SDK) 310, a runtime module 320, and one or more databases 330. In some example embodiments, the cloud computing system architecture 300 resides on one or more machines each having a memory and at least one processor (not shown). In some example embodiments, the components of the cloud computing system architecture 300 reside on the same machine, while in other example embodiments, some of the different components of the cloud computing system architecture 300 reside on separate remote machines that communicate with each other via a network (e.g., network 114 in FIG. 1). In some example embodiments, the cloud computing system architecture 300 is incorporated into the enterprise application platform 112 in FIG. 1 (e.g., on application server(s) 126). However, it is contemplated that other configurations are also within the scope of the present disclosure.

In some example embodiments, the cloud computing system architecture 300 implements software development, testing, and deployment using a phased approach, such as Development, Testing, Acceptance, and Production (DTAP). In a DTAP phased approach, a computer program or software component, such as a software solution, is developed within a development environment. For example, one or more developer users 305 may use the SDK 310 to develop a software solution. The SDK 310 comprises a programming package that enables the developer user(s) 305 to develop software solutions for a specific platform. In some example embodiments, the SDK 310 comprises one or more software development tools 312 configured to be used by the developer user(s) 305 to create software solutions. Examples of software development tools 312 include, but are not limited to, a source code editor and a visual builder. A source code editor is a text editor program designed specifically for editing source code of computer programs. A visual builder is a browser-based modeling tool that allows developer users 305 to create applications on existing data services. The SDK 310 may also include one or more libraries that the developer user 305 may use to develop software solutions, such as by incorporating content (e.g., code) from the libraries into the code being created by the developer user 305. A library is a collection of non-volatile resources used by computer programs, often for software development. These may include configuration data, documentation, help data, message templates, pre-written code and subroutines, classes, values or type specifications. Libraries may be included as part of the software development tools 312 or may be incorporated into the database(s) 330.

In some example embodiments, the SDK 310 is used by the developer user(s) 305 to create objects of the software solution. In some example embodiments, the objects comprise entities within a multi-tiered software application that works in conjunction with data access and domain logic layers to transport data. One example of such an object is a business object. However, other types of objects are also within the scope of the present disclosure.

In some example embodiments, a data access layer comprises a layer of a computer program that provides simplified access to data stored in persistent storage, such as in an entity-relational database. For example, the data access layer may return a reference to an object complete with its attributes instead of a row of fields from a database table, thereby allowing the client (or user) modules to be created with a higher level of abstraction. This kind of model may be implemented by creating a class of data access methods that directly reference a corresponding set of database stored procedures. Another implementation may retrieve or write records to or from a file system. The data access layer may hide this complexity of the underlying data store from the external world.

In some example embodiments, the domain logic comprises the part of the program that encodes the real-world rules (e.g., business rules) that determine how data can be created, stored, and changed. It is contrasted with the remainder of the software that is concerned with lower-level details of managing a database or displaying the user interface, system infrastructure, or generally connecting various parts of the program. In some example embodiments, the domain logic prescribes how objects (e.g., business objects) interact with one another, and enforces the routes and the methods by which objects are accessed and updated. In some example embodiments, the real-world rules model real-life objects (e.g., accounts, loans, itineraries, and inventories), and the domain logic comprises workflows that are the ordered tasks of passing documents or data from one participant (e.g., a person or a software system) to another.

The domain logic is distinguished from the real-world rules. The domain logic is the portion of an enterprise system that determines how data is transformed or calculated, and how it is routed to people or software (e.g., workflow), while the real-world rules are formal expressions of organization policy. Anything that is a process or procedure is domain logic, and anything that is neither a process nor a procedure is a real-world rule.

In some example embodiments, the production objects and the development objects comprise artifacts. An artifact is one of many kinds of tangible by-products produced during the development of software. Some artifacts (e.g., use cases, class diagrams, and other Unified Modeling Language (UML) models, requirements, and design documents) help describe the function, architecture, and design of software. Other artifacts are concerned with the process of development itself, such as project plans, business cases, and risk assessments. In some example embodiments, artifacts are associated with specific development methods or processes (e.g., Unified Process). In some example embodiments involving end-user development, the artifact comprises either an application or a complex data object that is created by an end-user without the need to know a general programming language. In some example embodiments, the artifact describes automated behavior or control sequences, such as database requests or grammar rules, or user-generated content.

The compiler 314 is configured to process the source code written by the developer user(s) 305 using the software development tools 312 and convert it into code that a computer's processor uses. For example, the compiler 314 may convert the source code generated by the software development tools 312 into executable code of a software solution that may be deployed as a runtime instance 322 of the software solution within the runtime module 320, where the runtime instance 322 of the software solution is accessible for use by one or more end users 325.

In some example embodiments, the SDK 310 restricts access to a development instance of the software solution to only the developer users 305 of the cloud computing system architecture 300, while the runtime module 320 makes a runtime instance 322 of the software solution accessible for use by one or more end users 325 of the cloud computing system architecture 300. In some example embodiments, the developer users 305 are different than the end users 325. In some example embodiments, a software solution comprises a computer program or software application that has been custom-built or configured to solve a specific problem. The software solution may be created out of several products or built on a software platform. In some example embodiments, objects or other data of the software solution are stored in the database(s) 330.

In some example embodiments, the cloud computing system architecture 300 comprises a multi-tenancy architecture. Multi-tenancy refers to a software architecture in which a single instance of software runs on a server and serves multiple tenants. A tenant is a group of users who share a common access with specific privileges to the software instance. With a multi-tenancy architecture, a software application is designed to provide every tenant a dedicated share of the instance, including its data, configuration, user management, tenant individual functionality, and non-functional properties. In some example embodiments, the cloud computing system architecture 300 comprises a multi-instance architecture in which separate software instances operate on behalf of different tenants.

In some example embodiments, the developer users 305 use the SDK 310 to define their own objects, including, but not limited to, user interfaces and web services. In some example embodiments, objects are modelled as a composition of structures, such as nodes, which in turn comprise elements that are typed by global data types (GDT). These elements define the persistency of their respective node. A GDTs are system-wide unified data types representing content. For example, GDTs may be unified data types that can be used consistently across the enterprise application platform 112 and any software solution created and running on the enterprise application platform 112. The semantics of GDTs are independent from their use in a specific application.

In some example embodiments, the enterprise application platform 112 provides the process integration content necessary for the communication between different systems and their components. In some example embodiments, the basis for the process integration content is an integrated business object model (iBOM) that is harmonized across industries and business areas. The iBOM describes the business-relevant concepts in one central location, meaning that it reflects all the design decisions that were made during the modeling of the business entities from the real world. The iBOM comprises the individual business objects and their relationships to one another. A business object is a capsule with an inner hierarchical structure, an object behavior specified by its operations, and constraints. Business objects are semantically disjoint, which means that a business information unit is represented exactly once. The internal structure of a business object is represented by hierarchically arranged nodes with their elements. Operations are ultimately derived from the iBOM, and this ensures their overall consistency.

The GDTs play a significant role in the harmonization of the structures of business object nodes in the iBOM across industries and business areas. Data types type the elements of business objects and their operations with a specified structure. A data type represents a specific business-related subject matter, and elements that reflect a particular subject matter are always typed by the same data type, resulting in harmonization across the business objects. A data type is a classification that specifies which type of value a variable has and what type of mathematical, relational or logical operations can be applied to it without causing an error.

As previously discussed, GDTs are system-wide normed and reconciled data types with business-related content as they occur in standards or would correspondingly be defined there. By the harmonization of the hierarchical signature, structures of operations and the structure of the business object nodes is achieved. Global data types represent a business-related subject matter that is described by a specified structure. If this semantic subject matter occurs in a business object node, in a business-to-business operation (e.g., exchange of messages across different organizations outside a firewall), or in an application-to-application operation (e.g., exchange of messages between different systems/ departments within the same organization inside a firewall), it is always typed by the same global data type, which leads to uniform typing across all business objects, interfaces, and operations. GDTs are, with regard to a subject matter, maximally defined data types that contain all elements required for the subject matter in different contexts. The elements used can be restricted and integrity constraints made stricter. Thus, based on a maximal GDT, further data types can be projected as context-specific restrictions.

Business objects and service operations have a specific business semantic and are built with regards to a usage. GDTs are used to type elements of business objects and service operations. Hence, GDTs are used in business objects and service operations in a specific context. Within a specific context, a GDT's semantics and structure may be restricted. A context-specific data type is derived from the GDT by means of a projection, and the projection of GDTs ensures a harmonization of the context-specific derived data types. Every context-specific derived data type is semantically a specialization and its structure comprises a subset of the GDT it is projected from.

Some GDTs are defined as codes with dedicated and predefined values. These code values may be independent such that their corresponding descriptions (e.g., what they represent) may be derived without the use of any other code values. For example, the GDT CountryCode may have code values that represent specific countries independent of any other code data types, such as the code value "DE" representing Germany and the code value "ES" representing Spain without the need for any other code value data types. However, some other GDTs are defined as codes that need a context to make clear what they represent. These codes are referred to as context-dependent data types. One example of a context-dependent data type is a GDT RegionCode that is dependent of a GDT CountryCode. Depending on the context of the CountryCode, the code value "08" for the RegionCode can mean different regions. In one example, when the CountryCode value equals "DE", the RegionCode value of "08" equals "BadenWurttemberg." When the CountryCode value equals "ES", the RegionCode value of "08" equals "Barcelona." And when the CountryCode value equals "FR", the RegionCode value of "08" equals "Ardennes." Additionally, some codes depend not only on a single other code value but on multiple other code values of other data types. In one example, a GDT TaxRateTypeCode depends on GDTs CountryCode, TaxTypeCode, and TaxCategoryCode.

In some example embodiments, the cloud computing system architecture 300 solves this dependency by using a supplementary component of a code GDT to contain the values on which the code itself depends upon. This supplementary component is referred to herein as "list ID" or "listID." Using this supplementary client, a client (e.g., a user interface) may filter a complete code list so that only the code values that are available based upon the context (e.g., the context that equals the listID) are shown.

Code lists can enumerate design time entities, such as process component code, object type code, and service interface code. In some example embodiments, one or more code lists are stored in the database(s) 330 and are presented to the developer user(s) 305 within a user interface of the software development tools 312, where one or more codes from the code lists may be selected for use in creating a software solution via the SDK 310.

In some example embodiments, the compiler 314 is configured to read the definition of an object created using the software development tool(s) 312 and automatically transfer the information from the definition into a meta data definition from which the runtime instance 322 of the software solution is derived. As a result of this automatic transfer of this information into a meta data definition from which the runtime instance 322 of the software solution is derived, the accuracy, efficiency, and convenience of the cloud computing system architecture 300 is increased, thereby improving the computer functionality of the cloud computing system architecture 300.

In some example embodiment, the compiler 314 is configured to receive source code generated within the software development kit 310. For example, the compiler 314 may receive source code generated by the software development tool(s) 312. In some example embodiments, the received source code comprises an object node having a data type definition for a code value of the object node.

In some example embodiments, the compiler 314 is configured to detect that the data type definition of the object node includes a context-dependent data type. The context-dependent data type is dependent on at least one other data type. In some example embodiments, the at least one other data type comprises a single other data type. However, in some example embodiments, the at least one other data type comprises a plurality of other data types.

In some example embodiments, the compiler 314 is configured to determine a corresponding value for each one of the at least one other data type in response to, or otherwise based on, the detecting that the data type definition of the object node includes the context-dependent data type. In some example embodiments, the determining the corresponding value for each one of the at least one other data type comprises retrieving context structure information for the context-dependent data type from a database (e.g., from the database(s) 330 in FIG. 3), identifying the at least one other data type based on the retrieved context structure information, searching the object node for any elements having a corresponding data type that matches any of the at least one other data type, identifying at least one element of the object node having a corresponding data type that matches any of the at least one other data type based on the searching of the object node, and determining a corresponding value for each one of the identified at least one element of the object node. In some example embodiments, the corresponding value for each one of the identified at least one element of the object node is the corresponding value for each one of the at least one other data type.

In some example embodiments, the compiler 314 is configured to generate a runtime instance 322 of an application based on the source code. In some example embodiments, the generating of the runtime instance of the application comprises assigning the corresponding value for each one of the at least one other data type as a single list ID for the object node. The single list ID for the object node is configured to be used to determine a dedicated value of the code value. In some example embodiments, the dedicated value for a code value is stored as part of a code list stored in the database(s) 330 and comprises a description of the code value. In some example embodiments, the at least one other data type comprises a plurality of other data types, and the single list ID for the object node comprises a combination of the plurality of other data types.

FIG. 4 illustrates a table 400 of list ID's, code values, and code value descriptions, in accordance with some example embodiments. In the table 400, each code value has multiple list IDs that define the context of the code value and can be used to identify the corresponding description. For example, in the table 400, the same CODE VALUE 1 has different corresponding descriptions depending on the particular context in which it is being used, which is determined by the list ID (e.g., CODE VALUE 1 in the context of LIST ID 1 corresponds to DESCRIPTION 1, while CODE VALUE 1 in the context of LIST ID 2 corresponds to DESCRIPTION 2). In some example embodiments, the table 400 or the associations represented in the table 400 are generated by the compiler 314 in its generation of the runtime instance 322 of the application and may be stored in the database(s) 330 for subsequent use by the runtime instance 322 of the application.

FIG. 5 illustrates another table 500 of list ID's, code values, and code value descriptions, in accordance with some example embodiments. In the example shown in FIG. 5, the table 500 includes multiple region code values that are each a context-dependent GDT. For example, depending on the context defined by the list ID, such as a country code, the region code value '08' has different descriptions (e.g., e.g., region code '08' in the context of list ID 'AD' corresponds to a description 'ESCALDES-ENGORDANY', while a region code '08' in the context of list ID 'AR' corresponds to a description 'LA ROJA').

In some example embodiments, the runtime module 320 is configured to execute the runtime instance 322 of the software solution. In some example embodiments, the executing the runtime instance 322 of the software solution comprises retrieving the dedicated value (e.g., the corresponding description element) of the code value using the single list ID and performing a function of the runtime instance 322 of the software solution using the retrieved dedicated value of the code value. In some example embodiment, the retrieving the dedicated value of the code value using the single list ID comprises searching a code list for an entry having a corresponding list ID that matches the single list ID, identifying the entry having the corresponding list ID that matches the single list ID based on the search of the code list, and retrieving a corresponding value of the identified entry for use as the dedicated value of the code value. In some example embodiments, the performing of the function of the runtime instance 322 of the software solution comprises displaying the retrieved dedicated value of the code value on a computing device. In some example embodiments, the performing of the function of the runtime instance 322 of the software solution comprises performing a calculation using the retrieved dedicated value of the code value.

Figure 6:
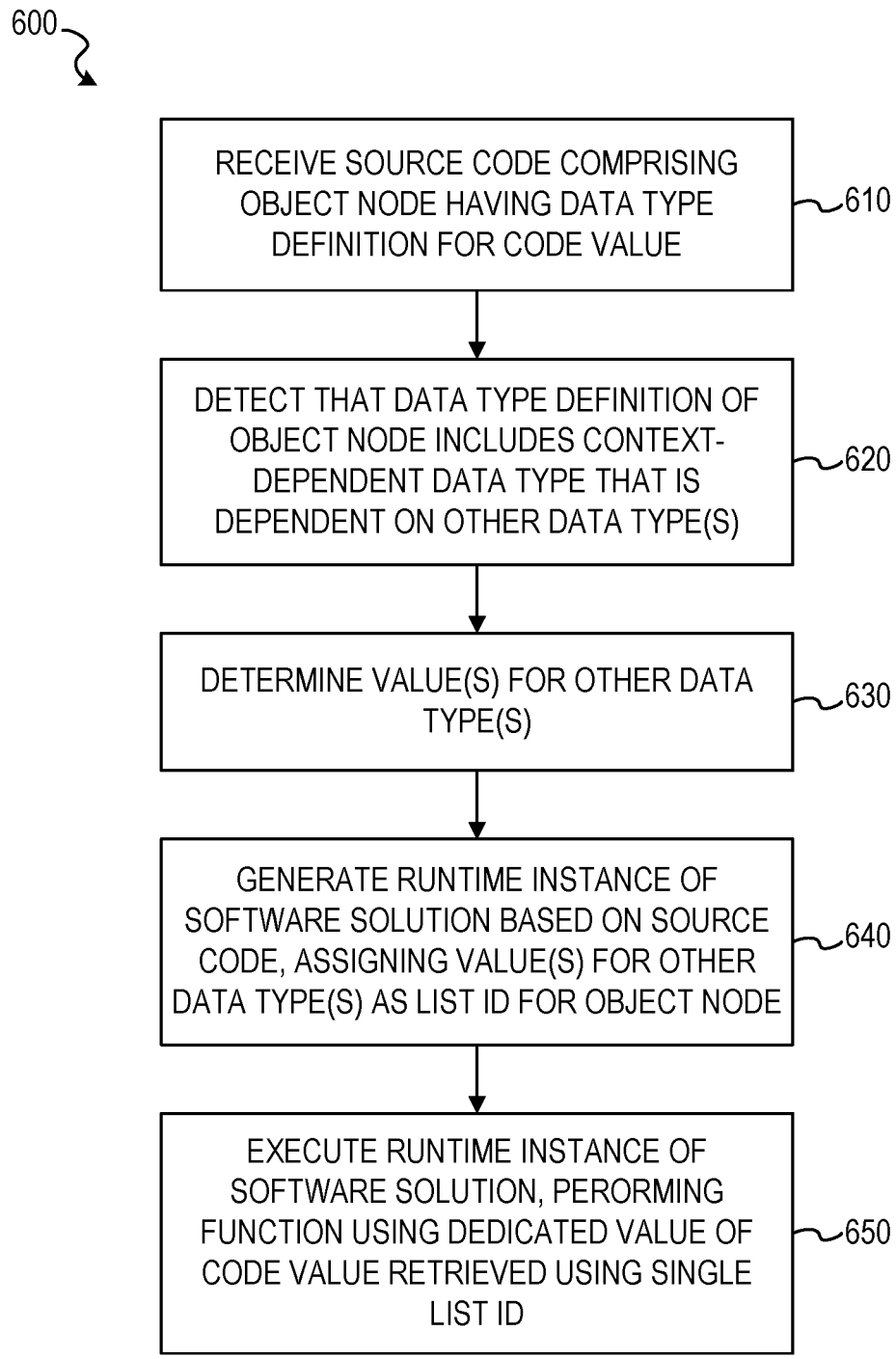
FIG. 6 illustrates a flowchart illustrating a method of a compiler for context-dependent code global data types, in accordance with some example embodiments.

FIG. 6 illustrates a flowchart illustrating a method 600 of a compiler for context-dependent code global data types, in accordance with some example embodiments. The method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by one or more of the components of the enterprise application platform 112 of FIG. 3 (e.g., the compiler 314, the runtime module 320) as described above.

At operation 610, the compiler 314 receives source code generated within a software development kit. In some example embodiments, the received source code comprises an object node having a data type definition for a code value.

At operation 620, the compiler 314 detects that the data type definition of the object node includes a context-dependent data type. In some example embodiments, the context-dependent data type is dependent on at least one other data type.

At operation 630, the compiler 314 determines a corresponding value for each one of the at least one other data type in response to, or otherwise based on, the detecting that the data type definition of the object node includes the context-dependent data type.

At operation 640, the compiler 314 generates a runtime instance of a software solution based on the source code. In some example embodiments, the generating of the runtime instance of the software solution comprises assigning the corresponding value for each one of the at least one other data type as a single list ID for the object node. In some example embodiments, the at least one other data type comprises a plurality of other data types, and the single list ID for the object node comprises a combination of the plurality of other data types. In some example embodiments, the single list ID for the object node is configured to be used to determine a dedicated value of the code value. In some example embodiments, the generating of the runtime instance of the software solution is performed by a compiler of the software development kit.

At operation 650, the runtime module 320 executes the runtime instance of the software solution. In some example embodiments, the executing the runtime instance comprises retrieving the dedicated value of the code value using the single list ID and performing a function of the runtime instance of the software solution using the retrieved dedicated value of the code value. In some example embodiments, the performing of the function of the runtime instance of the software solution comprises displaying the retrieved dedicated value of the code value on a computing device. In some example embodiments, the performing of the function of the runtime instance of the software solution comprises performing a calculation using the retrieved dedicated value of the code value.

It is contemplated that any of the other features described within the present disclosure can be incorporated into the method 600.

Figure 7:
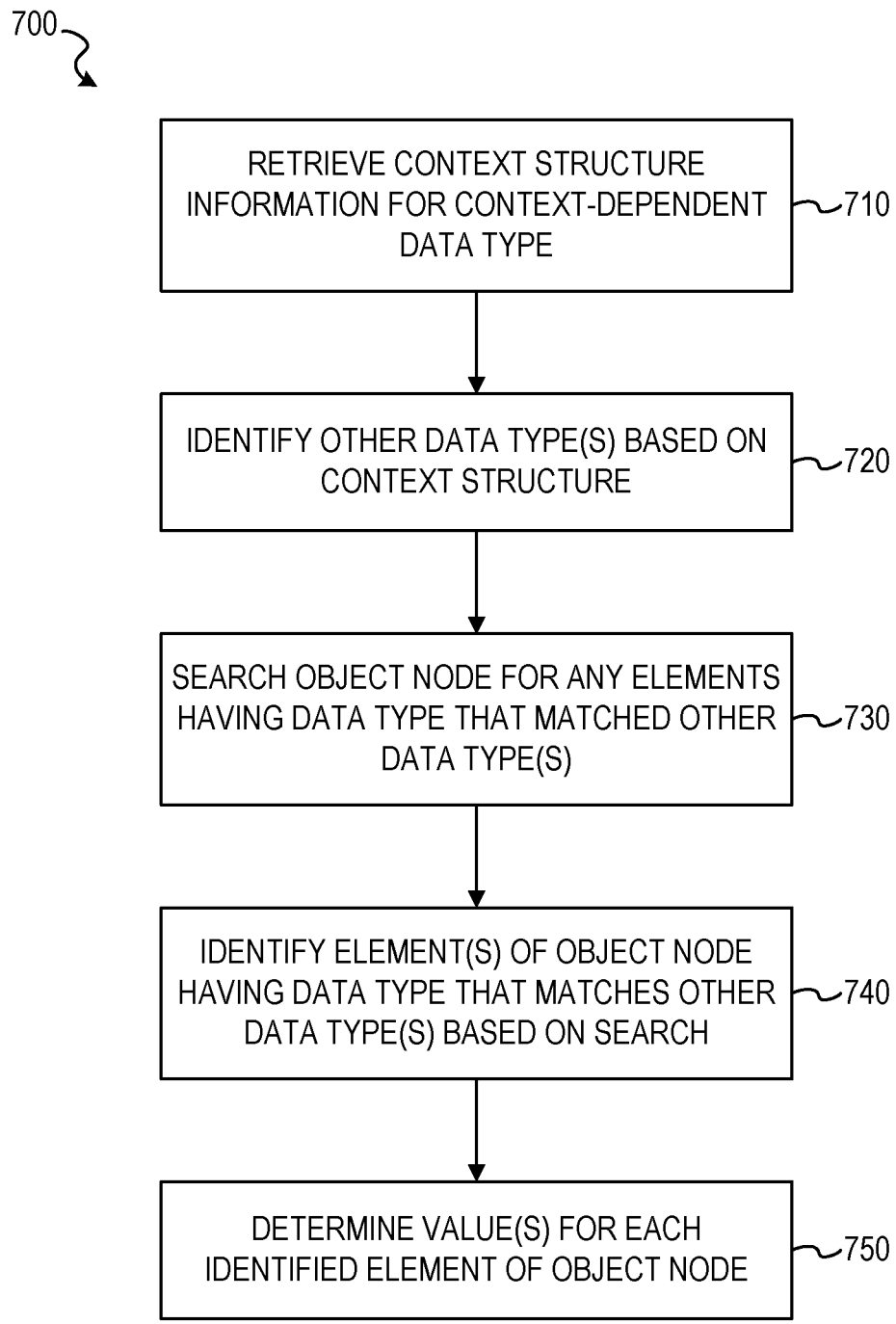
FIG. 7 is a flowchart illustrating a method of determining a corresponding value for each data type on which a context-dependent data type depends, in accordance with some example embodiments.

FIG. 7 is a flowchart illustrating a method 700 of determining a corresponding value for each data type on which a context-dependent data type depends, in accordance with some example embodiments. The method 700 can be performed by processing logic that can comprise hardware (e.g., circuitry, dedicated logic, programmable logic, microcode, etc.), software (e.g., instructions run on a processing device), or a combination thereof. In one example embodiment, the method 700 is performed by one or more of the components of the enterprise application platform 112 of FIG. 3 (e.g., the compiler 314, the runtime module 320) as described above.

At operation 710, the compiler 314 retrieves context structure information for the context-dependent data type from a database. At operation 720, the compiler 314 identifies the at least one other data type based on the retrieved context structure information. At operation 730, the compiler 314 searches the object node for any elements having a corresponding data type that matches any of the at least one other data type. At operation 740, the compiler 314 identifies at least one element of the object node having a corresponding data type that matches any of the at least one other data type based on the searching of the object node. At operation 750, the compiler 314 determines a corresponding value for each one of the identified at least one element of the object node. In some example embodiments, the corresponding value for each one of the identified at least one element of the object node is the corresponding value for each one of the at least one other data type.

It is contemplated that any of the other features described within the present disclosure can be incorporated into the method 700.

Figure 8:
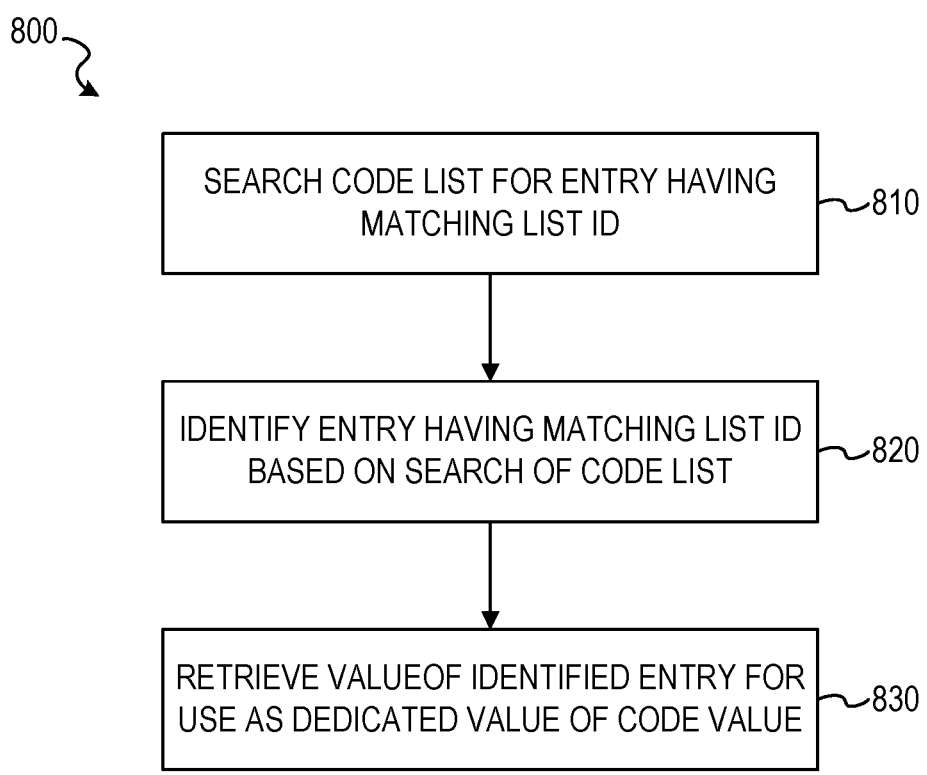
FIG. 8 is a flowchart illustrating a method of retrieving a dedicated value of a code value using a single list ID, in accordance with some example embodiments.

FIG. 8 is a flowchart illustrating a method 800 of retrieving a dedicated value of a code value using a single list ID, in accordance with some example embodiments. The method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by one or more of the components of the enterprise application platform 112 of FIG. 3 (e.g., the compiler 314, the runtime module 320) as described above.

At operation 810, the compiler 314 searches a code list for an entry having a corresponding list ID that matches the single list ID. At operation 820, the compiler 314 identifies the entry having the corresponding list ID that matched the single list ID based on the search of the code list. At operation 830, the compiler 314 retrieves a corresponding value of the identified entry for use as the dedicated value of the code value.

It is contemplated that any of the other features described within the present disclosure can be incorporated into the method 800.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
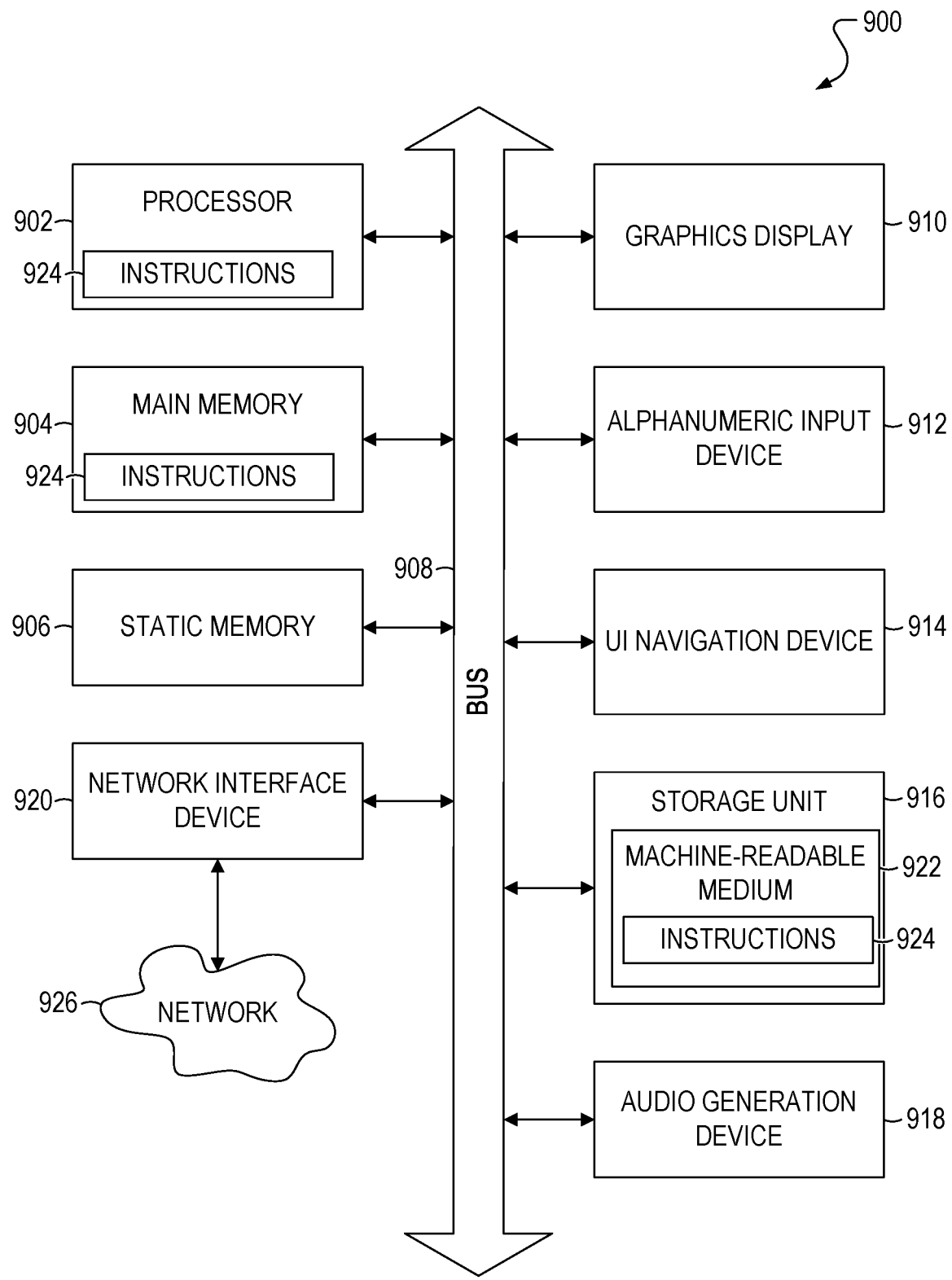
FIG. 9 is a block diagram of an example computer system on which methodologies described herein can be executed, in accordance with some example embodiments.

FIG. 9 is a block diagram of a machine in the example form of a computer system 900 within which instructions 924 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a graphics or video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a storage unit (e.g., a disk drive unit) 916, an audio or signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

EXAMPLES

1. A computer-implemented method comprising:
receiving, by at least one hardware processor, source code generated within a software development kit, the received source code comprising an object node having a data type definition for a code value;
detecting, by the at least one hardware processor, that the data type definition of the object node includes a context-dependent data type, the context-dependent data type being dependent on at least one other data type;
determining, by the at least one hardware processor, a corresponding value for each one of the at least one other data type based on the detecting that the data type definition of the object node includes the context-dependent data type;

generating, by the at least one hardware processor, a runtime instance of a software solution based on the source code, the generating of the runtime instance of the software solution comprising assigning the corresponding value for each one of the at least one other data type as a single list ID for the object node, the single list ID for the object node being configured to be used to determine a dedicated value of the code value; and executing, by the at least one hardware processor, the runtime instance of the software solution, the executing the runtime instance comprising retrieving the dedicated value of the code value using the single list ID and performing a function of the runtime instance of the software solution using the retrieved dedicated value of the code value.

2. The computer-implemented method of example 1, wherein the at least one other data type comprises a plurality of other data types, and the single list ID for the object node comprises a combination of the plurality of other data types.

3. The computer-implemented method of example 1 or example 2, wherein the determining the corresponding value for each one of the at least one other data type comprises:
retrieving context structure information for the context-dependent data type from a database;
identifying the at least one other data type based on the retrieved context structure information;
searching the object node for any elements having a corresponding data type that matches any of the at least one other data type;
identifying at least one element of the object node having a corresponding data type that matches any of the at least one other data type based on the searching of the object node; and
determining a corresponding value for each one of the identified at least one element of the object node, the corresponding value for each one of the identified at least one element of the object node being the corresponding value for each one of the at least one other data type.

4. The computer-implemented method of any one of examples 1 to 3, wherein the generating of the runtime instance of the software solution is performed by a compiler of the software development kit.

5. The computer-implemented method of any one of examples 1 to 4, wherein the retrieving the dedicated value of the code value using the single list ID comprises:
searching a code list for an entry having a corresponding list ID that matches the single list ID;
identifying the entry having the corresponding list ID that matched the single list ID based on the search of the code list; and
retrieving a corresponding value of the identified entry for use as the dedicated value of the code value.

6. The computer-implemented method of any one of examples 1 to 5, wherein the performing of the function of the runtime instance of the software solution comprises displaying the retrieved dedicated value of the code value on a computing device.

7. The computer-implemented method of any one of examples 1 to 6, wherein the performing of the function of the runtime instance of the software solution comprises performing a calculation using the retrieved dedicated value of the code value.

8. A system comprising:
at least one processor; and
a non-transitory computer-readable medium storing executable instructions that, when executed, cause the at least one processor to perform the method of any one of examples 1 to 7.

9. A non-transitory machine-readable storage medium, tangibly embodying a set of instructions that, when executed by at least one processor, causes the at least one processor to perform the method of any one of examples 1 to 7.

10. A machine-readable medium carrying a set of instructions that, when executed by at least one processor, causes the at least one processor to carry out the method of any one of examples 1 to 7.

Each of the features and teachings disclosed herein can be utilized separately or in conjunction with other features and teachings to provide a system and method for increasing accessibility of data across different environments of a computer system architecture. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving, by at least one hardware processor, source code comprising an object node having a data type definition for a code value;
   detecting, by the at least one hardware processor, that the data type definition of the object node includes a context-dependent data type, the context-dependent data type being dependent on at least one other data type;
   determining, by the at least one hardware processor, a corresponding value for each one of the at least one other data type based on context structure information for the context dependent data type; and
   generating, by the at least one hardware processor, a runtime instance of a software solution based on the source code, the generating of the runtime instance of the software solution comprising assigning the corresponding value for each one of the at least one other data type as an identification for the object node, the identification for the object node being configured to be used to determine a dedicated value of the code value from amongst a plurality of dedicated values of the code value, the plurality of dedicated values being stored in a database in association with a plurality of identifications, the plurality of identifications including the identification for the object node, each one of the plurality of dedicated values of the code value being associated in the database with a different identification in the plurality of identifications.

2. The computer-implemented method of claim 1, wherein the source code is generated within a software development kit.

3. The computer-implemented method of claim 1, wherein the determining the corresponding value for each one of the at least one other data type being based on the detecting that the data type definition of the object node includes the context-dependent data type.

4. The computer-implemented method of claim 1, wherein the determining the corresponding value for each one of the at least one other data type comprises:
   retrieving the context structure information for the context-dependent data type from a database;
   identifying the at least one other data type based on the retrieved context structure information;
   searching the object node for any elements having a corresponding data type that matches any of the at least one other data type;
   identifying at least one element of the object node having a corresponding data type that matches any of the at least one other data type based on the searching of the object node; and
   determining a corresponding value for each one of the identified at least one element of the object node, the corresponding value for each one of the identified at least one element of the object node being the corresponding value for each one of the at least one other data type.

5. The computer-implemented method of claim 1, further comprising executing, by the at least one hardware processor, the runtime instance of the software solution, the executing the runtime instance comprising retrieving the dedicated value of the code value using the identification for the object node and performing a function of the runtime instance using the retrieved dedicated value of the code value.

6. The computer-implemented method of claim 5, wherein the performing of the function of the runtime instance comprises displaying the retrieved dedicated value of the code value on a computing device.

7. The computer-implemented method of claim 5, wherein the performing of the function of the runtime instance comprises performing a calculation using the retrieved dedicated value of the code value.

8. A system comprising:
at least one processor; and
a non-transitory computer-readable medium storing executable instructions that, when executed, cause the at least one processor to perform operations comprising:
receiving source code comprising an object node having a data type definition for a code value;
detecting that the data type definition of the object node includes a context-dependent data type, the context-dependent data type being dependent on at least one other data type;
determining a corresponding value for each one of the at least one other data type based on context structure information for the context dependent data type; and
generating a runtime instance of a software solution based on the source code, the generating of the runtime instance of the software solution comprising assigning the corresponding value for each one of the at least one other data type as an identification for the object node, the identification for the object node being configured to be used to determine a dedicated value of the code value from amongst a plurality of dedicated values of the code value, the plurality of dedicated values being stored in a database in association with a plurality of identifications, the plurality of identifications including the identification for the object node, each one of the plurality of dedicated values of the code value being associated in the database with a different identification in the plurality of identifications.

9. The system of claim 8, wherein the source code is generated within a software development kit.

10. The system of claim 8, wherein the determining the corresponding value for each one of the at least one other data type being based on the detecting that the data type definition of the object node includes the context-dependent data type.

11. The system of claim 8, wherein the determining the corresponding value for each one of the at least one other data type comprises:
retrieving the context structure information for the context-dependent data type from a database;
identifying the at least one other data type based on the retrieved context structure information;
searching the object node for any elements having a corresponding data type that matches any of the at least one other data type;
identifying at least one element of the object node having a corresponding data type that matches any of the at least one other data type based on the searching of the object node; and
determining a corresponding value for each one of the identified at least one element of the object node, the corresponding value for each one of the identified at least one element of the object node being the corresponding value for each one of the at least one other data type.

12. The system of claim 8, wherein the operations further comprise executing the runtime instance of the software solution, the executing the runtime instance comprising retrieving the dedicated value of the code value using the identification for the object node and performing a function of the runtime instance using the retrieved dedicated value of the code value.

13. The system of claim 12, wherein the performing of the function of the runtime instance comprises displaying the retrieved dedicated value of the code value on a computing device.

14. The system of claim 12, wherein the performing of the function of the runtime instance comprises performing a calculation using the retrieved dedicated value of the code value.

15. A non-transitory machine-readable storage medium, tangibly embodying a set of instructions that, when executed by at least one processor, causes the at least one processor to perform operations comprising:
receiving source code comprising an object node having a data type definition for a code value;
detecting that the data type definition of the object node includes a context-dependent data type, the context-dependent data type being dependent on at least one other data type;
determining a corresponding value for each one of the at least one other data type based on context structure information for the context dependent data type; and
generating a runtime instance of a software solution based on the source code, the generating of the runtime instance of the software solution comprising assigning the corresponding value for each one of the at least one other data type as an identification for the object node, the identification for the object node being configured to be used to determine a dedicated value of the code value from amongst a plurality of dedicated values of the code value, the plurality of dedicated values being stored in a database in association with a plurality of identifications, the plurality of identifications including the identification for the object node, each one of the plurality of dedicated values of the code value being associated in the database with a different identification in the plurality of identifications.

16. The non-transitory machine-readable storage medium of claim 15, wherein the source code is generated within a software development kit.

17. The non-transitory machine-readable storage medium of claim 15, wherein the determining the corresponding value for each one of the at least one other data type being based on the detecting that the data type definition of the object node includes the context-dependent data type.

18. The non-transitory machine-readable storage medium of claim 15, wherein the determining the corresponding value for each one of the at least one other data type comprises:
retrieving the context structure information for the context-dependent data type from a database;

identifying the at least one other data type based on the retrieved context structure information;

searching the object node for any elements having a corresponding data type that matches any of the at least one other data type;

identifying at least one element of the object node having a corresponding data type that matches any of the at least one other data type based on the searching of the object node; and determining a corresponding value for each one of the identified at least one element of the object node, the corresponding value for each one of the identified at least one element of the object node being the corresponding value for each one of the at least one other data type.

19. The non-transitory machine-readable storage medium of claim 15, wherein the operations further comprise executing the runtime instance of the software solution, the executing the runtime instance comprising retrieving the dedicated value of the code value using the identification for the object node and performing a function of the runtime instance using the retrieved dedicated value of the code value.

20. The non-transitory machine-readable storage medium of claim 19, wherein the performing of the function of the runtime instance comprises displaying the retrieved dedicated value of the code value on a computing device or performing a calculation using the retrieved dedicated value of the code value.

* * * * *